(No Model.)
D. H. BENJAMIN.
WASHING MACHINE.
No. 394,672. Patented Dec. 18, 1888.
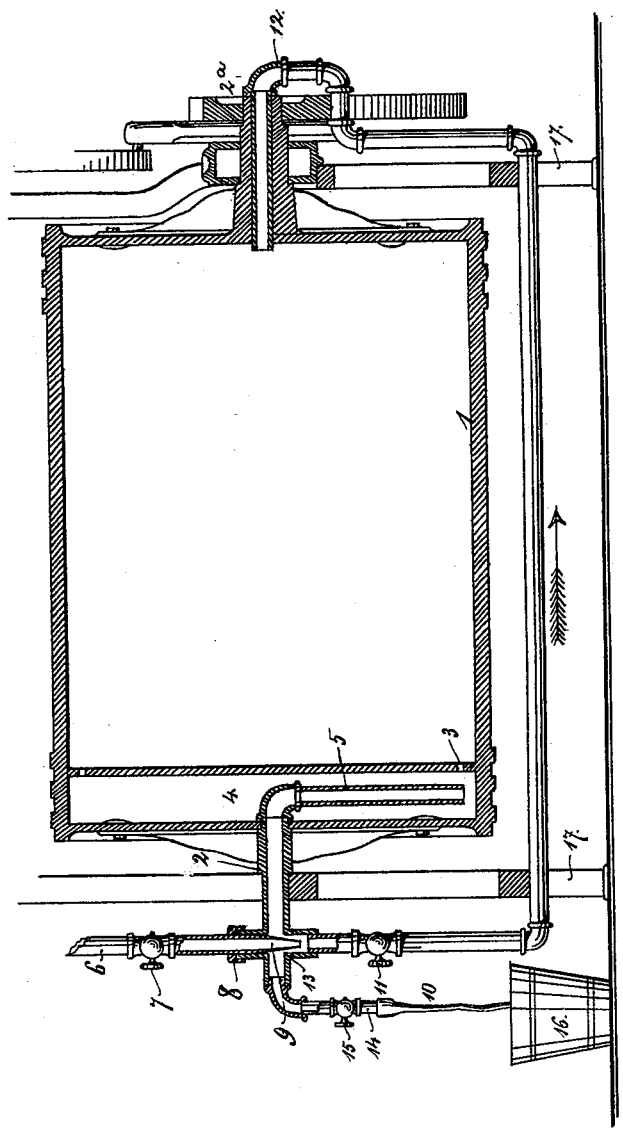
WITNESSES.
Rich. George
INVENTOR.
D. H. Benjamin
By Risley
Atty

UNITED STATES PATENT OFFICE.

DANA H. BENJAMIN, OF UTICA, NEW YORK, ASSIGNOR TO EDWARD HURLBURT, OF SAME PLACE.

WASHING-MACHINE.

SPECIFICATION forming part of Letters Patent No. 394,672, dated December 18, 1888.

Application filed November 17, 1886. Serial No. 219,135. (No model.)

*To all whom it may concern:*

Be it known that I, DANA H. BENJAMIN, of Utica, in the county of Oneida and State of New York, have invented certain new and useful Improvements in Washing-Machines; and I do hereby declare that the following is a full, clear, and exact description of the invention, which will enable others skilled in the art to which it appertains to make and use the same, reference being had to the accompanying drawing, and to the letters of reference marked thereon, which forms part of this specification.

My invention relates to a steam and fluid circulator; and it consists in the mechanism hereinafter described and claimed.

My invention is illustrated in the accompanying drawing as applied to washing-machines.

The figure shown in the drawing is a vertical section of a washing-machine with my invention applied.

I attain a uniform heat in the cylinder by creating the circulation of the water or fluid by passing the same through steam-pipes by the application of steam to accelerate the circulation and to heat the fluid while in circulation.

In the accompanying drawing, 1 represents a single cylinder or washing-machine mounted on hollow bearings 2 2ª in a frame suitably constructed in which frame the cylinder is rotated. At one end of the cylinder I provide a perforated partition, 3, forming chamber 4. To the end of the hollow stud forming the bearing for that end of the cylinder I provide pipe 5, open at or near the bottom of the chamber. This pipe is used as a suction-pipe, through which the fluid passes by circulation, as hereinafter described. Outside of the frame or cylinder I provide steam-supply pipe 6, controlled by stop-cock 7, which pipe is connected with the hollow stud or extension-pipe at 8, the steam-pipe having a tapering end, 9, projecting into circulating-pipe 10, leaving a space surrounding point 9 for the passage of the fluid. Pipe 10 is controlled by stop-cock 11. Pipe 10 connects with the hollow stud 2ª at 12, forming a continuous fluid-passage from the left to the right of the cylinder through the pipes and joints.

For inserting and mixing bleach or bluing or any other fluid substance with the water as it circulates, I provide pipe-cross 13. On the outer arms of the cross I attach connecting pipe or hose 14, controlled by stop-cock 15. The lower end of the hose or pipe may be inserted in vessel 16, containing bleach, bluing, or any other substance which may be required for use in the circulating fluid.

17 represents the frame in which the cylinder is mounted, furnishing bearings in which the hollow studs or bearings are supported.

The machine being in motion and supplied with the desired quantity of water, I circulate and heat the water as follows: Stop-cock 7 in the steam-supply pipe is turned in such manner as to allow the steam to pass through the pipe and discharge from the tapering end in the direction of pipe 10. By the movement of the steam a vacuum is created at or near the tapering end of pipe 9, which establishes the flow of water from the cylinder in the direction of the steam-pressure. The flow, when established, is accelerated, and the water heated by its contact with the steam, and the water thus heated is driven by the steam-pressure in the direction of the arrow, as shown, and is discharged into the opposite end of the cylinder. This circulation is continued until the water is brought to the desired degree of heat.

For mixing bluing or bleach with the moving current of water in pipe 10, the steam-pressure being applied as before stated, I open stop-cock 15 to allow the passage of the bleach or bluing. The vacuum surrounding the end of pipe 9 instantly establishes a current in the direction of the steam-pressure. The current of water and bleach uniting in pipe 10 are thoroughly united and mixed by its movement under steam-pressure, and the two so mixed are discharged into the opposite end of the cylinder thoroughly mixed, thereby preventing injury, the clothing being washed in the cylinder.

Other form of rotating cylinders may be used.

What I claim as new, and desire to secure by Letters Patent, is—

The combination, with a cylinder of a washing-machine mounted on hollow bearings and having a perforated partition in one end of the cylinder forming a chamber therein, of a pipe or passage-way connecting outside of the cylinder with the interior thereof through the hollow bearings, one end of the pipe or passage-way opening into the chamber of the cylinder below the hollow bearing, and a steam-supply pipe opening into the connecting-pipe or passage-way and adapted to discharge steam into the same in the direction in which the flow is required through a nozzle within the connecting-pipe or passage-way.

In witness whereof I have affixed my signature in presence of two witnesses.

DANA H. BENJAMIN.

Witnesses:
EDWIN H. RISLEY,
E. HURLBURT.